F. C. ZIEMSEN.
DEVICE FOR CUTTING AWAY REEDS AND WATER PLANTS GROWING IN PONDS AND RIVERS.
APPLICATION FILED JUNE 5, 1907.

911,357.  Patented Feb. 2, 1909.

Witnesses:

Inventor:
Friedrich Christoph Ziemsen
Harold Serrell
his atty.

UNITED STATES PATENT OFFICE.

FRIEDRICH CHRISTOPH ZIEMSEN, OF KLUSS, NEAR WISMAR, GERMANY.

DEVICE FOR CUTTING AWAY REEDS AND WATER-PLANTS GROWING IN PONDS AND RIVERS.

No. 911,357.  Specification of Letters Patent.  Patented Feb. 2, 1909.

Application filed June 5, 1907. Serial No. 377,321.

*To all whom it may concern:*

Be it known that I, FRIEDRICH CHRISTOPH ZIEMSEN, a citizen of the German Empire, and resident of Kluss, near Wismar, Mecklenburg, Germany, have invented a new and useful Improvement in Devices for Cutting Away Reeds and Water-Plants Growing in Ponds and Rivers, of which the following is a specification.

This invention relates to devices for cutting away reeds and water plants and the like in ponds and rivers and preferably comprises long flexible cutting members provided with suitable cutting edges and this invention is an improvement on the structures of similar devices shown and described in Letters Patent No. 868,958, granted to me October 22nd, 1907.

In carrying out my invention I preferably employ a cutting member of suitable material provided with a plurality of teeth arranged into several series running both longitudinally of the strip and spirally from end to end thereof, as will be hereinafter more particularly set forth.

Figure 1:
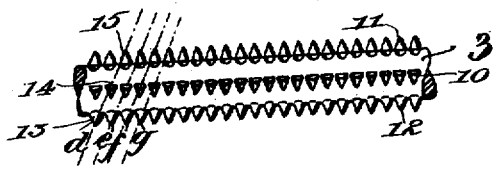
Figure 2:
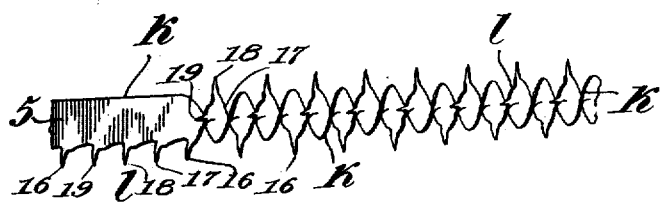

In the drawing, Figure 1 is an elevation of a portion of a metal rod illustrating one form of my present invention. Fig. 2 is a similar view illustrating a metal band embodying another form of my invention, and Fig. 3 is a view similar to Fig. 2, embodying a still further modification of the invention.

Referring to the drawing and particularly to Fig. 1, I may employ a rod or bar of metal or other material indicated at 3 and in the surface of which in suitable positions and by suitable means, I may cause the teeth indicated in the series 10, 11, 12 to be upset. Each of these series of teeth as shown in Fig. 1, preferably extend longitudinally of the strip from end to end thereof, and as will also be understood there is a fourth longitudinal series of teeth diametrically opposite the series 10. Now these teeth are also so placed on the surface of the strip that any tooth 13 for instance, in the series 12 and the next tooth 14 in the series 10 and the next advanced tooth 15 in the series 11 et cetera, comprise spirally arranged series of teeth as indicated by the dotted lines *d, e, f* and *g*, in Fig. 1, extending spirally and peripherally from end to end of the strip 3.

Referring to Fig. 2, I may employ a band of metal 5 or other suitable material, one edge *k* thereof being dull and the opposite edge *l* thereof being sharpened, and the sharpened edge *l* of the band is provided in any suitable manner with a series of teeth indicated at 16, 17, 18, and 19. Now as is also indicated in Fig. 2, this metal band 5 may be twisted so that each successive tooth is caused to assume a position at 90 degrees or thereabouts from its next adjacent tooth, so that the teeth 16 will form a longitudinal series of teeth extending from end to end of the band, the teeth 17 will form a similar series in a position at right angles to the series of teeth formed by the teeth 16, the teeth 18 a still further and similar series of teeth, and the teeth 19 a fourth similar series, while the teeth 16, 17, 18, and 19 taken successively form a spiral series of teeth extending peripherally from end to end of the band.

Figure 3:
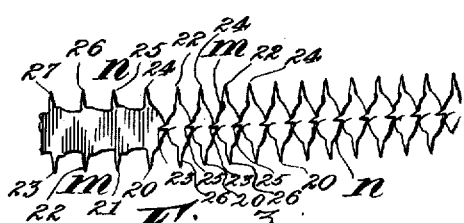

With reference to Fig. 3, I may employ a band similar to the band 5 shown in Fig. 2, except that both edges *m, n*, thereof are provided with teeth—the former with the teeth 20, 21, 22 and 23, and the latter with the teeth 24, 25, 26, 27, the tooth 20 in the edge *m* being approximately oppositely disposed to the tooth 24 in the edge *n*, the tooth 21 to the tooth 25, the tooth 22 to the tooth 26, the tooth 23 to the tooth 27, and also that this band may be twisted to such a position that the teeth 20, 26, will constitute one longitudinal series, the teeth 21, 27 another longitudinal series, the teeth 22, 24 still another longitudinal series and the teeth 23, 25, a fourth longitudinal series, it being apparent that the teeth so formed also comprise a spirally arranged series extending peripherally from end to end of the band.

I claim as my invention:

1. A device for cutting away reeds and water plants, consisting in a long flexible cutting member having a series of teeth cut in and raised from the surface of the said member and extending both longitudinally and spirally from end to end thereof.

2. A device for cutting away reeds and water plants, consisting in a long flexible member provided with a cutting edge having series of teeth cut therein and raised therefrom, said teeth extending both longitudinally and spirally from end to end of the said member.

3. A device for cutting away reeds and water plants, consisting in a long flexible band of metal provided with a cutting edge and the said cutting edge incised at intervals and the projections so formed turned up as series of teeth, and the said band being so twisted that the teeth are arranged in both longitudinal and spirally disposed series extending from end to end of the band.

4. A device for cutting away reeds and water plants, consisting in a long flexible band of metal having teeth on both edges thereof, the said teeth being formed by incising the edges of the band and turning up the projections, and the said band being so twisted that the said teeth are placed in both longitudinal and spirally disposed series extending from end to end of the band.

5. A device for cutting away reeds and water plants consisting in a long flexible band of metal having one edge sharpened and having a series of teeth formed therefrom by raising spaced apart portions of said cutting edge in which said sharpened edge forms the advancing edge of the teeth.

In witness whereof I have hereunto set my hand in the presence of two witnesses.

FRIEDRICH CHRISTOPH ZIEMSEN.

Witnesses:
WOLDEMAR HAUPT,
ARTHUR SCHRAEDER.